April 16, 1935.　　W. EWALD　　1,997,818
RADIATOR
Filed Feb. 3, 1932　　3 Sheets-Sheet 1
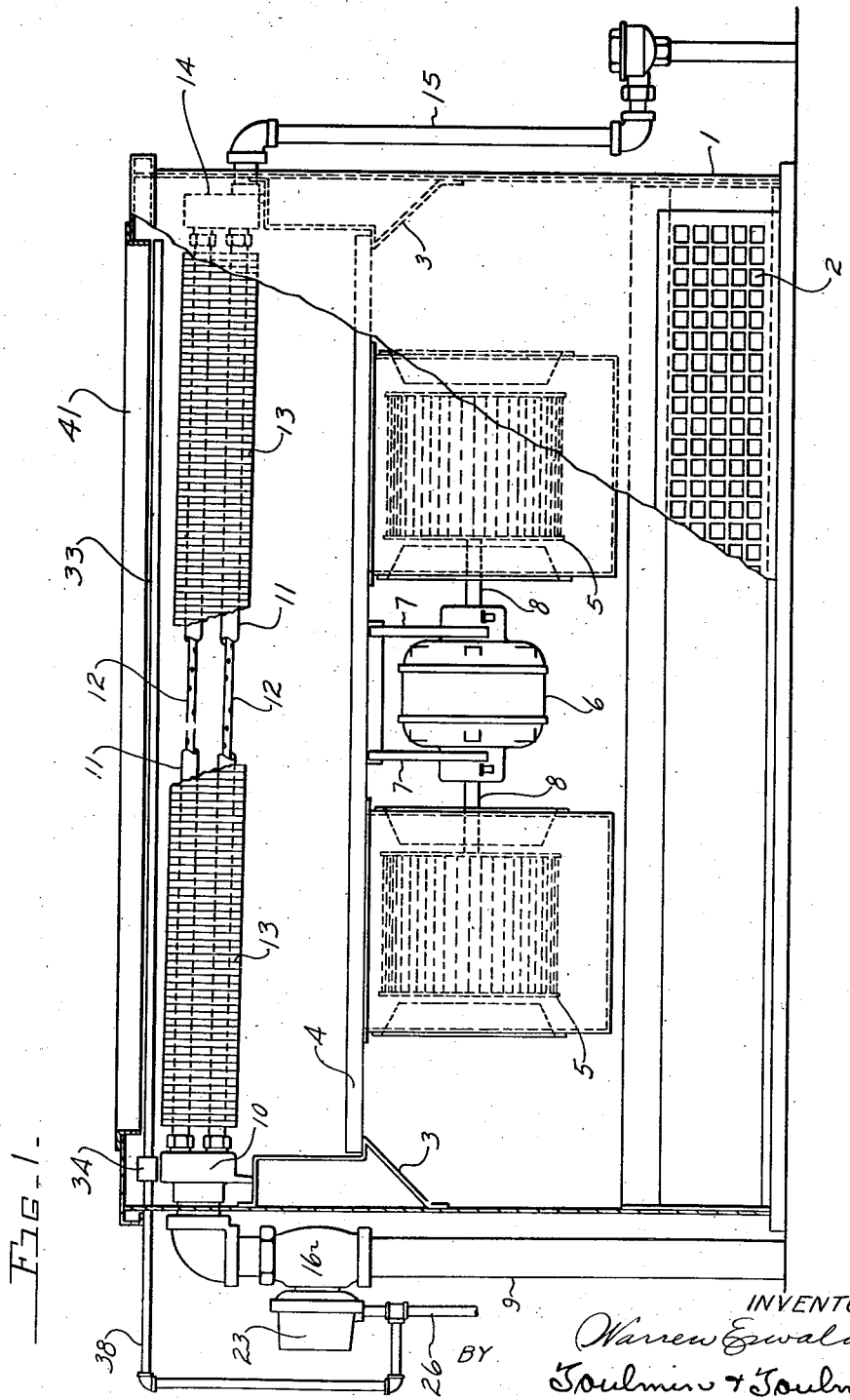

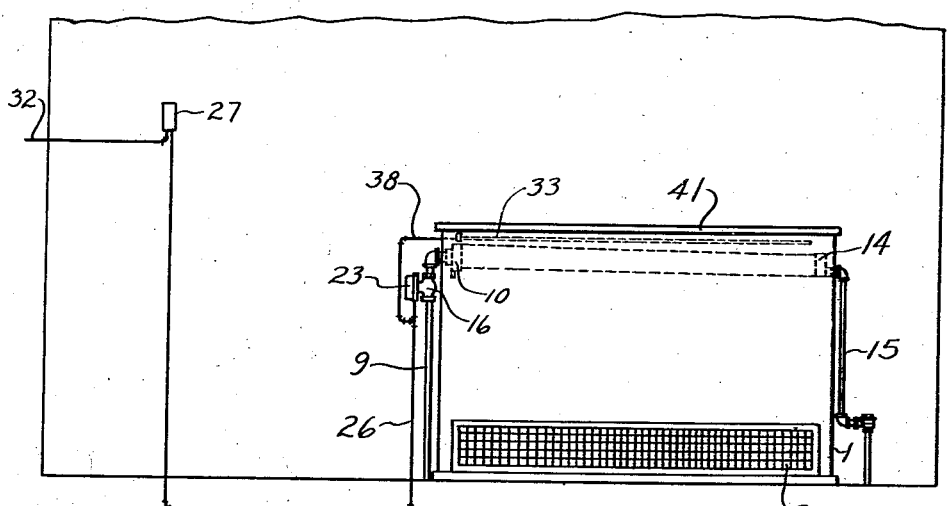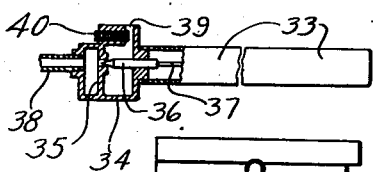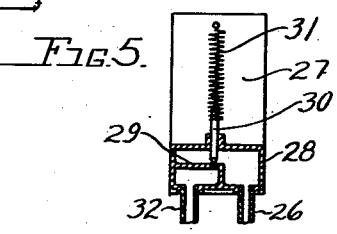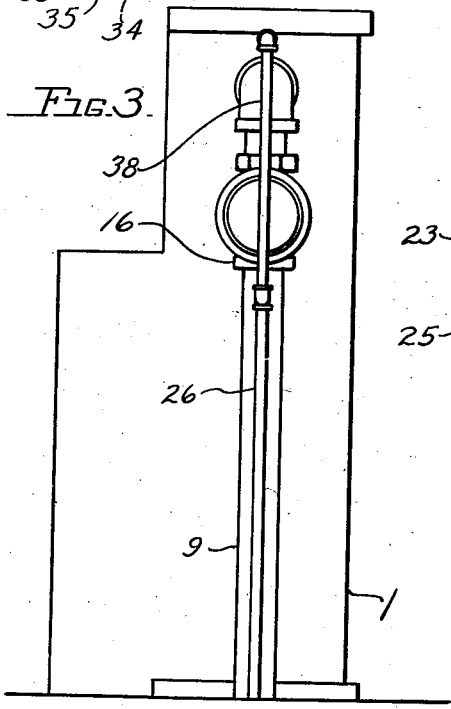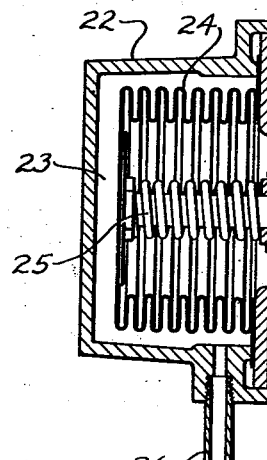

April 16, 1935.  W. EWALD  1,997,818
RADIATOR
Filed Feb. 3, 1932   3 Sheets-Sheet 3
Fig. 7.
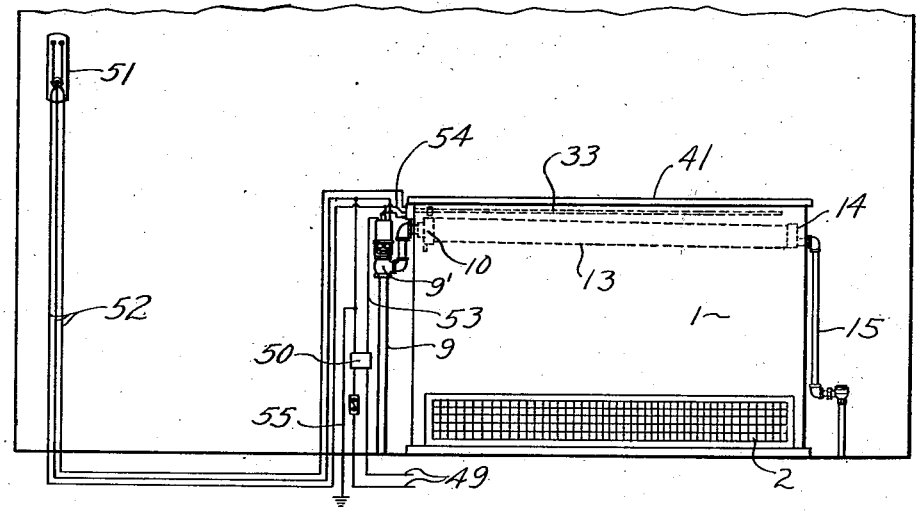
Fig. 9.
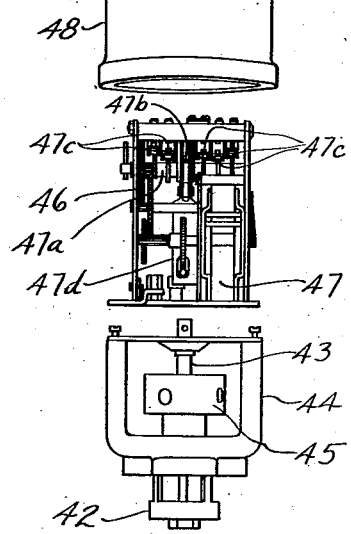
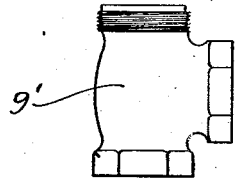
Fig. 8.
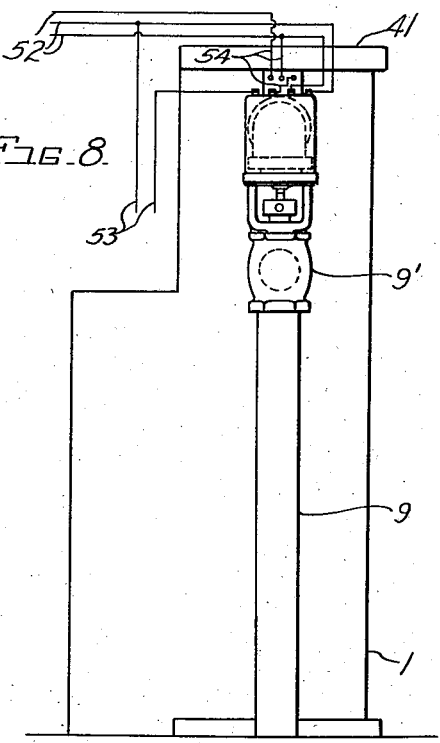
INVENTOR.
Warren Ewald
BY Toulmin + Toulmin
ATTORNEYS.

Patented Apr. 16, 1935

1,997,818

UNITED STATES PATENT OFFICE 1,997,818

RADIATOR

Warren Ewald, Columbus, Ohio, assignor, by mesne assignments, to The Buckeye Blower Company, Columbus, Ohio, a corporation of Delaware Application February 3, 1932, Serial No. 590,654

3 Claims. (Cl. 236—38)

This invention relates to improvements in radiators, and has for its object the providing of a dual control for a single-valve radiator.

One of the means for controlling the valve is operated by the temperature condition of the room in which the radiator is located, remote from the radiator. The other of the dual means for controlling the valve is located adjacent the radiator and is operated by the temperature condition adjacent the radiator.

It is an object of this invention to provide two classes of means for controlling a single-valve radiator. In one there is a source of compressed air for operating the valve, and the application of compressed air to the valve is controlled in one instance by a thermostat located remote from the radiator, and in the other instance by a thermostat located adjacent the radiator. The purpose of one of these controls is to shut off the heating fluid from the radiator at a certain temperature, while the other control is to admit a limited amount of the heating fluid to the radiator when the temperature adjacent the radiator reaches a certain definite low temperature. The control adjacent the radiator acts in opposition to that located in the room remote from the radiator.

It is also an object of this invention to provide an electrical control for a single valve admitting a heating fluid to the radiator.

It is my object to vary the flow of the heating fluid as a function of the temperature of the heated space.

These and other advantages will appear from the following description taken in connection with the drawings.

Referring to the drawings:

Figure 1 is a front elevation of the radiator unit with parts removed to show the interior structure.

Figure 2 is a front elevation of the heating unit showing the thermostatic connections therewith.

Figure 3 is a view of the righthand end of the heating unit as shown in Figure 1.

Figure 4 is a vertical, longitudinal section through a section of the inlet pipe and the valve casing connected thereto.

Figure 5 is a vertical section through the thermostat located in the room remote from the radiator.

Figure 6 is a view showing the thermostatic means located adjacent the radiator.

Figure 7 is a view similar to Figure 2 but showing electrical means for controlling the admission of the heating fluid to the radiator.

Figure 8 is an end elevation of the heating unit as shown in Figure 7.

Figure 9 shows unassembled the various parts of the electrically operated means for controlling the valve.

The heating unit as a whole is shown in Figures 1 and 2. This heating unit consists essentially of a casing 1, provided with suitable air inlets and outlets. One of the air inlets, as shown in these figures, is indicated by the numeral 2, and is used to admit inside air into the casing. On the inside and at each end of the casing is a bracket 3. These brackets support a longitudinally extending frame 4, which has extending downwardly therefrom and located within the casing a pair of fans 5. These fans are operated by means of a motor 6 suspended by a frame 7 beneath the frame 4. The fans are operated by a motor shaft 8, which continues into and forms the shafts for the fans.

At one end of the casing is an inlet pipe 9, leading from some suitable source of heat supplying fluid to the radiator, which consists of an inlet head 10, an outlet head 14, radiator tubes 11, distributor tubes 12, within the radiator tubes, and fins 13 located on the radiator tubes. The purpose of the distributor tubes is to distribute the hot water or steam, whichever is used, equally to all parts of the radiator. After the heating fluid has passed through the radiator and the outlet head 14, it is conveyed back by means of an outlet pipe 15 in the usual manner.

Forming part of the inlet pipe 9 is a valve connection 16, which has therein a partition 17 with an opening 18 therein. This opening is normally open so that there is a free passage of the heating fluid from the source into the radiator, but for closing this opening there is provided a valve 19 having a valve stem 20 extending out through a plug 21, located in one side of the valve connection 16. To this plug is attached a casing 22, which forms a pressure chamber 23 for closing the valve 19.

Within the pressure chamber is a metallic bellows 24 fitting over the open end of the chamber which engages the plug 21. The outer periphery of the open end of the metallic bellows is securely attached to the casing 22 to form an air-tight closure between the metallic bellows and the casing. With the metallic bellows and around the valve stem is a spring 25. One end of this spring abuts against the end of the valve stem remote from the valve and the part of the metallic bellows that is closed. The other end of the spring abuts against a gland fitting around the valve stem and engaging the plug 21.

This spring tends to hold the valve in open position, as shown in Figure 4, but yields on pressure in the chamber formed by the casing so that the valve may be closed. Pressure is admitted to the chamber by means of a pipe 26 connected at one end to the casing, while its other end is connected to a thermostat unit 27. This thermostat unit includes a casing 28, which has a partition 29 therein forming two chambers connected to each other by means of a small hole or opening in the partition.

This hole or opening may be closed by means of a valve 30, which is supported by one wall of the casing and operated by means of a thermostatic element 31, as shown in Figure 5. The thermostatic element is influenced by the temperature condition of the room remote from the radiator, and is adapted to close the valve when the temperature of the room falls below 72 degrees. When the valve is open air, or other gases, under pressure, is admitted from a pipe 32 into the casing and from the casing through the pipe 26 to the chamber 23 for closing the valve 19.

When the temperature of the room is above 72 degrees this thermostatic valve 30 is open so that pressure is admitted to the chamber 23 for closing the valve 19. This valve remains closed, as far as the pressure through the pipe 26 is concerned, as long as the temperature adjacent the thermostat remains at 72 degrees F. or thereabove. The air pressure used for operating the valve is about fifteen pounds, and is supplied from some suitable source of air or gas under pressure.

The thermostat unit 27 is for remote control. There is provided, adjacent the radiator, a second thermostat unit 33, consisting of a long pipe, closed at one end and open at the other. The open end is closed by means of a casing 34, having a projection on one side fitting into the open end of the thermostat tube. This casing 34 is divided by a partition 35 into two small chambers, connected to each other by a small opening controlled by a valve 36, connected to and operated by a heat-responsive thermostatic element 37 extending into the tube forming part of the thermostat unit. Extending from one chamber of the casing 34 is a pipe 38, extending from casing 34 to the pipe 26, as shown in Figure 1. From the other chamber of the casing is an outlet 39 controlled by means of a screw plug 40.

The purpose of this thermostatic unit is to prevent the temperature adjacent the radiator from reaching too low a point. Each of these thermostatic units may be regulated to suit the convenience or temperature condition required. While the other thermostatic unit 27 is responsive to a temperature change at 72 this thermostatic unit is adapted to operate the valve 36 to open it when the temperature adjacent the radiator falls below 65 degrees, or some other desired predetermined minimum temperature to prevent drafts in the room.

Whenever the temperature adjacent the radiator falls below the predetermined desired temperature, the valve 36 opens. This opening of the valve causes a relief in the air pressure in the chamber 23 so that the pressure therein is reduced to such a point that the spring 25 will slightly open the valve 19 so that some of the heat-bearing fluid will pass through the pipe 9 into the radiator for maintaining a degree of heat in the radiator. The spring 25 is so constructed that it will withstand a pressure of eleven pounds so that if the pressure within the chamber 23 is reduced from fifteen pounds to eleven or near eleven pounds, the valve 19 will open to cause a higher degree of heat in the radiator.

This thermostat operates when the valve is closed and when the pressure is fully applied to the chamber 23 for closing the valve. The opening may be from an intermediate position to a still larger degree of opening, according to the temperature desired as influenced by steam pressure and outside temperature. It operates by releasing a part of the pressure from the chamber 23 so that the valve 19 may be slightly open. This thermostatic unit 33, in the present instance, is located immediately above the radiator and beneath an outlet 41, in the form of an outlet grill usually found in connection with heater units of this type.

In Figures 7, 8 and 9 electrical control is provided for the valve which admits the heating fluid to the radiator. In this form the casing, the radiator and the pipe leading to and from the radiator are in all respects identical to those shown in the pressure control heating unit. In this form the valve connection in the inlet pipe 9 is indicated by the numeral 9′, and has therein a valve 42 on the lower end of a valve stem or plunger 43, guided and supported by a frame or bonnet 44. This frame or bonnet is threaded onto the upper end of the valve connection 9′, and is supported in a vertical position above the valve connection.

In connection with the valve stem there is provided a packing gland 45. Supported on top of the frame or bonnet 44 is a motor unit 46, consisting of a motor 47, a cam shaft 47a, with a cam 47b thereon, and contact cams 47c. The cam 47b operates a plunger sleeve 47d for operating the valve stem or plunger 43. The parts are assembled by properly fastening by screws, or other means, the motor unit on top of the frame or bonnet and placing over the motor unit a cover 48.

The motor used is a small shading ring induction motor which has been designed for this type of service, and has characteristics suitable to the peculiar requirements here called for. Through a chain of gears, located on various shafts in connection with the motor unit, a valve stem is operated. The motor turns the cam shaft, on which is mounted a cam that imparts a positive longitudinal motion to the plunger sleeve. This sleeve, which is part of the cam follower, fits over the valve stem with a yielding connection, including a spring which exerts a definite predetermined pressure on the valve when the valve is closed.

The cam shaft also carries cams to stop the motor when the valve is either fully open or completely closed. In this way power is consumed only when the motor is actually doing the work of opening or closing the valve. If it were otherwise the cost of power might become a serious factor.

The electric supply lines are indicated by the numeral 49, and form the primary of a transformer 50.

Located in the room remote from the radiator is a thermostat 51 which operates under heat conditions to control the current of electricity to the motor located in the motor unit. This thermostat is of the bi-metal type and adapted in one position to direct the current through the motor in one direction, and in another position to direct the current through the motor in another direction so that the motor will rotate in different directions for operating the gear mechanism to open or close the valve. The numeral 52 is used to designate the conductors extending from the thermostat 51 to the transformer 50, and these conductors form part of the secondary circuit 53 of the transformer. The numeral 54 is used to designate the connections or conductors extending from the motor to the thermostat located above the radiator so that the temperature condition immediately adjacent the radiator may affect the operation of the motor and the opening of the valve. The numeral 55 is used to designate a ground extending from one branch of the secondary of the transformer.

The purpose of the electrical control is to operate the valve so that a predetermined, or substantially even temperature condition will exist in the room. The motor is set in motion through the thermostat 51 at a certain temperature for closing or opening the valve. In the event that the valve is closed the incoming air stream passing over the radiators engages the thermostat. This reduction in the temperature causes the thermostat adjacent the radiator to form an electrical connection with the motor, whereby the motor is slightly operated to let a limited amount of heating fluid through the valve into the radiator, thereby tempering the air passing over the radiator so that too low a degree of temperature will not result. Whenever the temperature in the remote part of the room has changed one way or the other, the motor will properly operate to suitably open or close the valve for the desired results.

It will be further understood that the thermostatic means in the room may operate to either close or open the valve; it will be understood that the position of the valve at any time may be modified by the thermostat in the casing changing the degree of opening or closing. The changes will be not only from closed to open position, but from intermediate positions.

It will be further understood that where I refer to a heater that I am referring specifically to any ventilating equipment, or combined heating and ventilating equipment, or purely heating equipment.

It will be understood that I desire to comprehend within my invention such modifications as come within the scope of my claims and my invention.

Having thus fully described my invention, what I claim as new and desire to secure by Letters Patent, is:

1. In a heating apparatus for a room, a radiator having a pipe connecting it to a source of heat bearing fluid, a valve in said pipe, a motor for operating said valve to open and close the pipe, a thermostatically operated switch in the room remote from the radiator to cause the operation of the motor to move the valve to close the pipe, and a thermostatically operated means adjacent the radiator to cause the motor to rotate to slightly move the valve whereby a small amount of the heat bearing fluid is admitted to the radiator to temper the air passing over the radiator.

2. In a heating apparatus for a room, a radiator having a pipe connecting it to a source of heat bearing fluid, a valve in said pipe, a motor for operating said valve to open and close the pipe, a thermostatically operated switch in the room remote from the radiator to cause the operation of the motor to move the valve to close the pipe, a thermostatically operated means adjacent the radiator to cause the motor to rotate to slightly move the valve whereby a small amount of the heat bearing fluid is admitted to the radiator to temper the air passing over the radiator, and automatic means to stop the motor in each operation thereof after a definite movement of the valve.

3. In a heating apparatus for a room, a casing having an inlet and an outlet, means to cause a current of air through the casing, a radiator in said casing having a pipe connected to a source of heating fluid, a valve adapted to close the pipe, a spring having eleven pounds pressure tending to hold the valve open, thermostatically operated pressure means adapted to apply a pressure of fifteen pounds to the valve to close it, and means operated by the temperature of the current of the air adjacent the radiator to reduce the air pressure so that the spring will slightly open the valve to admit a slight amount of heating fluid to the radiator to prevent the air adjacent the casing becoming too cool.

WARREN EWALD.